(12) United States Patent
Lim (10) Patent No.: US 10,457,889 B2
(45) Date of Patent: Oct. 29, 2019

(54) LOW-TEMPERATURE TREATED PERILLA OIL FOR SUPPRESSING GENERATION OF COAGULATED SUSPENDED MATERIALS DURING LOW-TEMPERATURE COLD STORAGE AND PREPARATION METHOD THEREFOR

(71) Applicant: Soobok Lim, Busan (KR)

(72) Inventor: Soobok Lim, Busan (KR)

(73) Assignee: Soobook LIM, Busan (KR)

( * ) Notice: Subject to any disclaimer, the term of this patent is extended or adjusted under 35 U.S.C. 154(b) by 0 days.

(21) Appl. No.: 16/319,984

(22) PCT Filed: Jul. 24, 2017

(86) PCT No.: PCT/KR2017/007943
§ 371 (c)(1),
(2) Date: Jan. 23, 2019

(87) PCT Pub. No.: WO2018/021776
PCT Pub. Date: Feb. 1, 2018

(65) Prior Publication Data
US 2019/0264131 A1 Aug. 29, 2019

(30) Foreign Application Priority Data
Jul. 25, 2016 (KR) .................. 10-2016-0093951

(51) Int. Cl.
| | | |
|---|---|---|
| C11B 1/08 | (2006.01) | |
| C11B 3/00 | (2006.01) | |
| C11B 1/04 | (2006.01) | |
| A23D 9/04 | (2006.01) | |

(52) U.S. Cl.
CPC .................. *C11B 1/08* (2013.01); *A23D 9/04* (2013.01); *C11B 1/04* (2013.01); *C11B 3/008* (2013.01)

(58) Field of Classification Search
CPC ........................................................ C11B 1/08
USPC .............................................................. 554/8
See application file for complete search history.

(56) References Cited

FOREIGN PATENT DOCUMENTS

| | | |
|---|---|---|
| CN | 103013651 A | 4/2013 |
| KR | 10-0407925 B1 | 12/2003 |
| KR | 10-0741406 B1 | 7/2007 |
| KR | 10-0830349 B1 | 5/2008 |
| KR | 10-2013-0044277 A | 5/2013 |
| KR | 10-2015-0061204 A | 6/2015 |

(Continued)

*Primary Examiner* — Deborah D Carr
(74) *Attorney, Agent, or Firm* — Rabin & Berdo, P.C.

(57) ABSTRACT

The present invention relates to a low-temperature treated perilla oil for suppressing generation of coagulated suspended materials during low-temperature cold storage and a preparation method therefor, and more particularly, to a low-temperature treated perilla oil for suppressing generation of coagulated suspended materials during low-temperature cold storage and a preparation method therefor, wherein in the low-temperature storage and cold storage of perilla oil, which are essentially implemented to increase the storage period of the perilla oil through the minimization of rancidity of the perilla oil, a perilla oil without the generation of coagulated suspended materials during low-temperature cold storage is provided, and thus a high-quality clean perilla oil that does not give an eating person an unpleasant feeling due to suspended materials is provided.

2 Claims, 5 Drawing Sheets

(56) References Cited

FOREIGN PATENT DOCUMENTS

| KR | 102015006120 | * | 6/2015 |
|---|---|---|---|
| KR | 10-1613484 B1 | | 4/2016 |
| KR | 10-2016-0061764 A | | 6/2016 |

* cited by examiner

LOW-TEMPERATURE TREATED PERILLA OIL FOR SUPPRESSING GENERATION OF COAGULATED SUSPENDED MATERIALS DURING LOW-TEMPERATURE COLD STORAGE AND PREPARATION METHOD THEREFOR

TECHNICAL FIELD

The present invention relates to a low-temperature treated perilla oil for suppressing generation of coagulated suspended materials during low-temperature cold storage and a preparation method therefor, and more particularly, to a low-temperature treated perilla oil for suppressing generation of coagulated suspended materials during low-temperature cold storage and a preparation method therefor, wherein in the low-temperature storage and cold storage of perilla oil, which are essentially implemented to increase the storage period of the perilla oil through the minimization of rancidity of the perilla oil, a perilla oil without the generation of coagulated suspended materials during low-temperature cold storage is provided, and thus a high-quality clean perilla oil that does not give an eating person an unpleasant feeling due to suspended materials is provided.

BACKGROUND ART

A perilla, which is one of representative oilseed crops in Korea, is a perennial plant belonging to the family Lamiaceae. It is originated in southeast Asia including Korea, and has been widely used as a food such as health food, hypertension prevention food as well as simple edible food.

The use of the perilla in Korea is recorded in the unified Silla period with sesame seeds. It grows easily at the foot of a mountain of the country or at wetlands along the roadside, and is distributed everywhere in the country.

The perilla has the three major nutrients, which are 45% fat, 18% protein, and 28% carbohydrates, and has been used for many years as an important maintainer.

The method of extracting the perilla oil from the perilla includes various extracting method such as a roasting and heat pressing method, in which the perilla is roasted and pressed, a supercritical extraction method, in which high-priced machines are used to extract by solvent, a cold pressede method using an oil expression without roasting the perilla, in which the perilla is dried and then oil-expressed as it is, thereby producing the perilla oil through the precipitating and filtrating steps. However, the supercritical extraction method suffers a lot of rejection from consumers due to the risk of solvent. Also, in case of the cold pressede method, the flavor of the perilla oil is relatively lower than that of the roasting and heat pressing method. Accordingly, most of the perilla oils are produced by the roasting and heat pressing method.

The roasting and heat pressing method is a method of producing perilla oil by roasting perilla seeds at high temperature (160 to 230° C.). There is a problem that substances such as benzophene are detected. Also, since the supercritical extraction method can be rapidly and selectively extracted, there is no risk of a residual harmful solvent and it is possible to extract a substance sensitive to heat such as a natural product or food. However, it is not realistic because the production cost is very high.

The perilla oil extracted from the perilla contains about 35% to 46% of fatty acids, about 10% of saturated fatty acids, and about 90% of unsaturated fatty acids, 60% of which are n-3 unsaturated fatty acids. It is known that the perilla has a physiological action effective in the prevention of adult diseases such as an improvement of hardening of arteries and high blood, a change in the quality of the stiff tissue, drop in blood pressure, an improvement of thrombosis, an inhibition of cancer cell growth, an improvement of learning ability, a brain development, improvement of allergic constitution, and a life extension and so on. Accordingly, the value of use thereof is growing more and more.

Accordingly, the techniques of Patent Literatures 1 to 4 have been proposed for producing the perilla oil.

The Patent Literature 1 relates to a method for preparing an oil product by using powdered sesame seed and perilla seed including steps of sorting and pulverizing sesame seed and perilla seed; mixing 20 wt % of the finely powdered sesame seed and 5 wt % of the powdered perilla seed with 75 wt % of cooking oil made from corn; extracting the mixture at 190° C. for 60 mins and first filtrating the extract with a separator to remove the solid from the mixture; and then secondary filtrating the resulting liquid by using a filter press and adding 0.03 wt % of Polyphenox to the completely filtrated liquid of oil. The method has an effect of serving the oil having unique taste and aroma of the sesame and the perilla at the same time.

Patent Literature 2 relates to a method of manufacturing edible plant oil and an edible plant oil manufactured by using the same, in which saturated fatty acid is removed by subjecting edible vegetable oil to chemical treatment to remove saturated fatty acid and reconstituting with unsaturated fatty acid is provided. The edible oil contains useful components for the body and is beneficial to human body. First, edible vegetable oil is trans-esterified with C1-8 alkanol in the presence of C1-8 alkoxide catalyst of alkali or alkaline earth metals, neutralized with organic acid or inorganic acid and removed in the alkanol to produce an alkyl ester mixture of saturated and unsaturated fatty acid. Second, the alkyl ester mixture of saturated and unsaturated fatty acid is reacted with urea dissolved in C1-8 alkanol to remove a complex of fatty acid alkyl ester and urea. Then 3 mol of the separated unsaturated fatty acid alkyl ester is mixed with triglyceride comprising C1-8 low molecular weight fatty acid and trans-esterified with C1-8 alkanol in the presence of C1-8 alkoxide catalyst of alkali or alkaline earth metals.

Patent Literature 3 relates to a fresh perilla seed oil and a method for manufacturing the same. The method for manufacturing fresh perilla seed oil according to an embodiment of the present invention includes a washing step of washing perilla seeds with water and draining the same; a cold air drying step of drying the washed perilla seeds with a cold wind of 15-20° C.; an oil expression step of wrapping the dried perilla seed in a mesh cloth and applying pressure to the same at 15-20° C. so as to collect fresh perilla seed oil; and refining step of letting the expressed fresh perilla seed oil stand at 5-10° C. There are effects having a high extraction yield and excellent quality.

Patent Literature 4 relates to a method for manufacturing sesame oil or perilla seed oil according to the present invention including a washing step (S100) of removing remaining pesticides or foreign substances adhered to the surface of sesame seeds or perilla seeds by a mixed solution in which sodium hydrogen carbonate is dissolved; a dehydrating step (S200) of removing purified water and drying the surface of the sesame seeds or perilla seeds, after washing the surface using the mixed solution; a roasting step (S300) of roasting the sesame seeds or perilla seeds dried after the purified water is removed; an oil extracting step (S400) of extracting oil from the roasted sesame seeds or perilla seeds using an oil expression; a purifying step (S500) of mixing the extracted sesame oil or perilla seed oil with hardwood activated charcoal powder, and purifying the same by a filter to manufacture the purified sesame oil or perilla seed oil; and a packing step (S600) of packing the purified sesame oil or perilla seed oil into a predetermined amount to complete the manufacturing process of the purified sesame oil or perilla seed oil. In the washing step (S100), a bamboo salt powder in addition to the sodium hydrogen carbonate is further mixed to produce the mixing solution. At this time, it is mixed in a weight ratio of 50 to 60 parts of sodium hydrogen carbonate and 5 to 10 parts of bamboo salt powder and the sodium hydrogen carbonate and the bamboo salt powder are pulverized in a particle size of 50 to 100 µm by using a mill.

On the other hand, the perilla oil as the edible oil contains a variety of fats, sterols, monoterpenes, tocopherols, polyphenol compounds and the like. Especially, since α-linolenic acid, which is a highly unsaturated fatty acid, is the main component, there is a problem in that it is easily acidified. Accordingly, the usability thereof is extremely limited.

Therefore, since the perilla oil is easy to oxidize and the shelf life thereof is short, it is recommended to consume as quickly as possible after opening and the refrigeration thereof is recommended during storing.

However, since the perilla oil contains various fatty acids, during storing at low temperature or in a refrigerator, the perilla oil is solidified, so that white spots or white precipitates are formed.

As a part of this, in the perilla oil distributed in and out of the country, the perilla oil product (DL) having caution statements "freezing coagulation phenomenon (occurrence of white spots or precipitates) is generated during winter, low temperature, or refrigeration storage, but there is no abnormality in the product" can be easily found. This is to prevent the consumer from having a negative perception on the problem caused by the above-mentioned perilla oil coagulation phenomenon. However, it does not solve the fundamental problem on the occurrence of the floating matter owing to the freezing coagulation phenomenon generated in the perilla oil.

That is, in the perilla oil, α-linolenic acid, which is often referred to as omega-3 fatty acid, is contained as a major component in an amount of about 60%. However, since this is a component that is susceptible to rancidity, it is required to be stored in a refrigerator. In case of the oil expression through a heating treatment at high temperature, since carcinogens such as benzopyran and trans fatty acids are produced, it is necessary to process, express, and store it in accordance with the characteristic of the perilla oil. However, due to the inability to perform such process in harmony, peoples are not able to get the perilla oil, which is an excellent plant oil, properly. Also, during the cold storage for preventing rancidity, it causes inconvenience to those who ingest it, because of the floating matter produced by the low temperature.

In the Patent Literature 1, after the finely powdered sesame seed, the perilla seed, and the cooking oil made from corn are mixed to express oil, it is first filtrated through the centrifugal separator and then secondary filtrated through the filter press to manufacture the final product. Accordingly, it has unique taste and aroma of the sesame and the perilla at the same time. However, since it is extracted at a high temperature of 190° C., the trans fatty acids and the carcinogenic substances such as benzopyran are produced. Also, in order to delay the rapid rancidity due to the characteristics of α-linolenic acid, the refrigeration storage is essential. However, during refrigeration storage, since various fatty acids contained in the perilla oil has different melting points, even if the primary and secondary filtration processes are carried out, the floating matters are produced, which causes people who ingest them to feel uncomfortable.

The Patent Literature 2 is constructed so as to provide the edible vegetable oil which is obtained by removing a saturated fatty acid and reconstituted with only the unsaturated fatty acid through the chemical treatment step. However, in the perilla oil manufactured by the Patent Literature 2, in order to delay the rapid rancidity due to the characteristics of α-linolenic acid, the refrigeration storage is also essential. However, during refrigeration storage, since various fatty acids contained in the perilla oil has different melting points, even if the primary and secondary filtration processes are carried out, the floating matters are produced, which causes people who ingest them to feel uncomfortable. According to the method for manufacturing the perilla oil as described in Example 8, it heats and processes at a high temperature of 105° C., Accordingly, there arises a problem that the trans fatty acid is generated and the carcinogenic substance such as benzopyrene is produced. Therefore, in the manufacturing method of the Patent Literature 2, it does not meet the characteristics of the perilla oil.

In the Patent Literature 3, it is refined only by a process of standing at a temperature of 5 to 10° C. and is subjected to the refining process without a separate filtration process so as to realize the clean state. However, as a result of the fact that those skilled in the art have accomplished this, it has been found that there is almost no other residue at the stage of standing at a temperature of 5 to 10° C. However, when it stores for about 10 hours or more in the refrigerator, it was confirmed that the floating matters were generated similarly to the conventional perilla oil. Also, the amount of the floating matters was slightly smaller than that of the conventional perilla oil when visually confirmed. However, as can be seen from the sensory evaluation described in the following description, it was confirmed that the perilla oil is pretty much the same as the conventional perilla oil, which is mainly due to the different melting points of the various fatty acids contained in the perilla oil. Accordingly, there is a problem that it causes people who ingest them to feel uncomfortable. Also, there is a problem in that the flavor and aroma thereof are relatively lowered due to the unroasted raw perilla produced by the oil expression.

In Patent Literature 4, after mixing the expressed perilla seed oil with the hardwood activated charcoal powder, it purifies the same by the filter so as to remove odor contained in the perilla oil. Accordingly, it provides sterilized perilla oil with good flavor, so that it can provide the perilla oil capable of delaying the rancidity thereof. However, the delay of the rancidity is only a temporary delay of rancidity due to the temporary sterilization of germs contained in the perilla oil. Accordingly, when the cold storage and the refrigeration storage not accompanied, since the rancidity thereof is much faster than that in the refrigeration storage, the refrigeration storage is essential. However, during refrigeration storage, since various fatty acids contained in the perilla oil has different melting points, even if the primary and secondary filtration processes are carried out, the floating matters are produced, which causes people who ingest them to feel uncomfortable. According to <3. roasting step (S300)> below a paragraph number [0054] of the Patent Literature 4, the perilla is put into a high-temperature roasting oven maintained at a temperature of 310° C. and roasted at a temperature of 190° C. to 230° C. At this time, since there arises a problem that the trans fatty acid is generated and the carcinogenic substance such as benzopyrene is produced, in the manufacturing method of the Patent Literature 4, it does not meet the characteristics of the perilla oil.

PATENT LITERATURE

Patent Literature 1 Korean Patent registration No. 10-0407925 (Nov. 20, 2003)
Patent Literature 2 Korean Patent registration No. 10-0741406 (Jul. 13, 2007) Patent Literature 3 Korean Patent publication No. 10-2016-0061764 (Jun. 1, 2016)
Patent Literature 4 Korean Patent registration No. 10-1613484 (Apr. 12, 2016)

DISCLOSURE

Technical Problem

The present invention has been made in view of the above-mentioned problems, and it is an object of the present invention to provide a method for preparing a high-quality clean perilla oil that does not give an eating person an unpleasant feeling, and a perilla oil prepared by the same, wherein in the low-temperature storage and cold storage of perilla oil, which are essentially implemented to increase the storage period of the perilla oil through the minimization of rancidity of the perilla oil, a perilla oil is provided without the generation of coagulated suspended materials during low-temperature cold storage.

It is another object of the present invention to provide a method for preparing a perilla oil that does not generate carcinogens such as trans-fatty acids and benzopyrene, which are harmful to the human body, in a preparation process, and a perilla oil prepared by the same.

It is a further object of the present invention to provide a method for preparing a perilla oil that is beneficial to the human body while maximizing the flavor of perilla oil and is harmless during intake, and a perilla oil prepared by the same.

Technical Solution

According to one aspect of the present invention so as to accomplish these objects, there is provided to a method for preparing a low-temperature treated perilla oil for suppressing generation of coagulated suspended materials during low-temperature cold storage, the method including:
a drying step (S200) of drying the perilla washed through the perilla washing step with hot air of 30 to 100° C. for 1 to 8 hours such that the perilla has a moisture percentage of 1 to 15%;
an oil expression step (S300) of inserting the perilla dried through the drying step (S200) into an oil expression machine and expressing a perilla oil for 1 to 60 minutes by application of pressure at a temperature of 0 to 60° C.;
a low-temperature treatment step (S500) of treating the perilla oil expressed through the oil expression step (S300) at a low temperature below 25° C.;
a filtering step (S600) of filtering the perilla oil treated at a low temperature through the low-temperature treatment step (S500) using a food screen of 1 to 50 μm; and a container charging step (S700) of charging a container with the perilla oil filtered through the filtering step (S600).

Advantageous Effects

Accordingly, the present invention has an effect to provide a method for preparing a high-quality clean perilla oil that does not give an eating person an unpleasant feeling, and a perilla oil prepared by the same, wherein in the low-temperature storage and cold storage of perilla oil, which are essentially implemented to increase the storage period of the perilla oil through the minimization of rancidity of the perilla oil, a perilla oil is provided without the generation of coagulated suspended materials during low-temperature cold storage.

Also, the present invention has another effect to provide a method for preparing a perilla oil that does not generate carcinogens such as trans-fatty acids and benzopyrene, which are harmful to the human body, in a preparation process, and a perilla oil prepared by the same.

Moreover, the present invention has further another effect to provide a method for preparing a perilla oil that is beneficial to the human body while maximizing the flavor of perilla oil and is harmless during intake, and a perilla oil prepared by the same.

BRIEF DESCRIPTION OF DRAWINGS

The above and other objects, features and advantages of the present invention will be more apparent from the following detailed description taken in conjunction with the accompanying drawings, in which.

BEST MODE

Mode for Invention

Exemplary embodiments of the present invention will be described below in more detail with reference to the accompanying drawings so as to be easily carried out by those skilled in the art. These embodiments are provided so that this disclosure will be thorough and complete, and will fully convey the scope of the present invention to those skilled in the art. The present invention may, however, be embodied in different forms and should not be construed as limited to the embodiments set forth herein.

In the whole specification of the present invention, it will be understood that when a component is referred to as "comprising or including" any component, it does not exclude other components, but can further comprise or include the other components unless otherwise specified.

In the whole specification of the present invention, it will be understood that when a step is referred to as being located "on" or "before" another step, it may have the same rights as not only in the case where the step is in a direct time series relationship with another step but also in the case of an indirect time series relationship in which the time series order of two steps can be changed as in the mixing step after each step.

The terms "about", "substantially", and the like in the whole specification of the present invention are used in numerical values or in close proximity to the numerical values when inherent tolerances for preparation and materials are presented in the mentioned meanings, and are used to prevent unauthorized exploitation of precise or absolute numerical disclosures referred to facilitate the understanding of the invention by an unscrupulous infringer.

The term "step of ~(doing)" or "step of ~" used in the whole specification of the present invention does not mean "step for ~".

Figure 1:
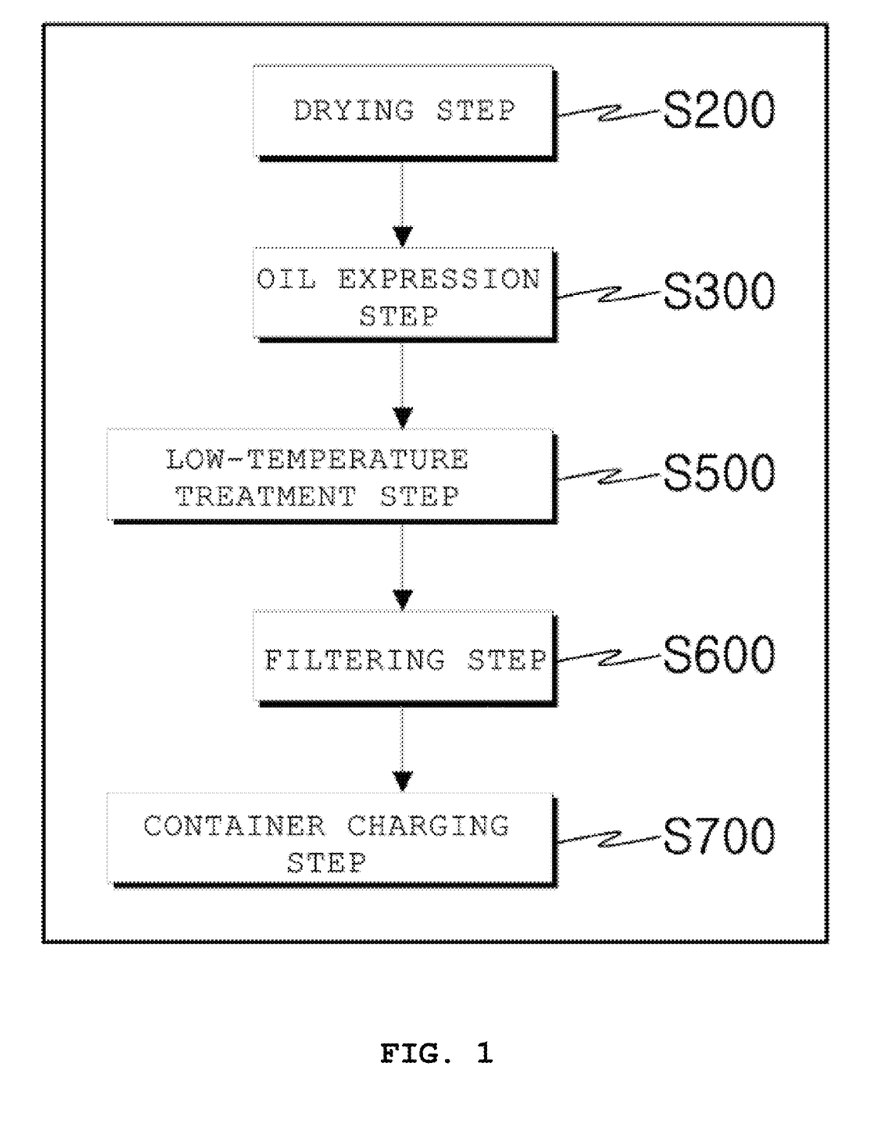
FIG. 1 is a flowchart illustrating a method for preparing perilla oil according to a first embodiment of the present invention.
Figure 2:
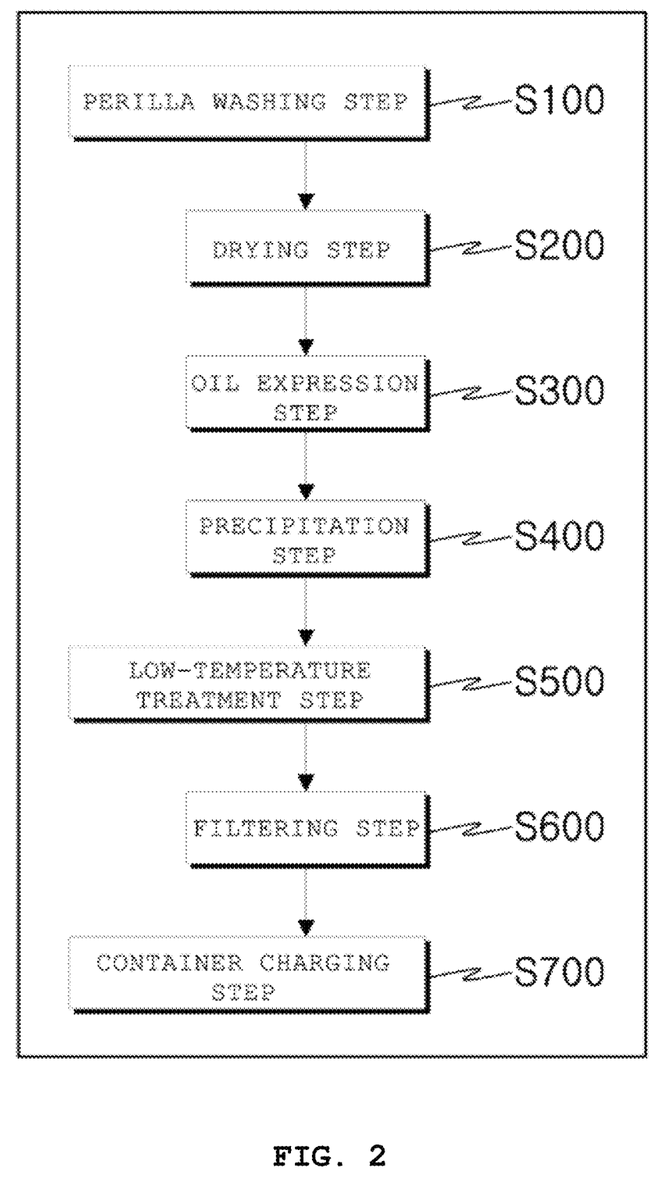
FIG. 2 is a flowchart illustrating a method for preparing perilla oil according to second and third embodiments of the present invention.

FIG. 1 is a flowchart illustrating a method for preparing perilla oil according to a first embodiment of the present invention. FIG. 2 is a flowchart illustrating a method for preparing perilla oil according to second and third embodiments of the present invention.

The present invention relates to a low-temperature treated perilla oil for suppressing generation of coagulated suspended materials during low-temperature cold storage and a preparation method therefor. Preferably, the above-mentioned coagulated suspended materials are to include all coagulated suspended materials, condensed suspended materials, and frozen suspended materials which may be generated at a temperature lower than room temperature when the perilla oil is stored at a low temperature or refrigerated.

Hereinafter, the present invention will be described with reference to the drawings. The method according to the first embodiment of present invention includes a drying step (S200), an oil expression step (S300), a low-temperature treatment step (S500), a filtering step (S600), and a container charging step (S700), as illustrated in FIG. 1.

In more detail, the method for preparing a perilla oil to express a perilla oil from washed perilla includes:

a drying step (S200) of drying washed perilla with hot air of 30 to 100° C. for 1 to 8 hours such that the perilla has a moisture percentage of 1 to 15%;

an oil expression step (S300) of inserting the perilla dried through the drying step (S200) into an oil expression machine and expressing a perilla oil for 1 to 60 minutes by application of pressure at a temperature of 0 to 60° C.;

a low-temperature treatment step (S500) of treating the perilla oil expressed through the oil expression step (S300) at a low temperature such that the perilla oil has a temperature less than or equal to 25° C.;

a filtering step (S600) of filtering the perilla oil treated at a low temperature through the low-temperature treatment step (S500) using a food screen of 1 to 50 μm; and a container charging step (S700) of charging a container with the perilla oil filtered through the filtering step (S600).

In the drying step (S200), the washed perilla is dried with hot air of 30 to 100° C. for 1 to 8 hours such that the perilla has a moisture percentage of 1 to 15%.

In the drying step (S200), the moisture percentage of the washed perilla is lowered to increase an extraction yield, and the perilla is roasted with hot air so that the expressed perilla oil has a savory fragrance and a flavor.

In the drying step (S200), the moisture percentage of the perilla is to be 1 to 15% so that the moisture between the skin of the perilla and the kernel of the perilla is dried and the moisture between the skins of the perilla is dried, so the perilla particles are arranged evenly, thereby enabling the extraction yield to be increased by applying uniform pressure to the perilla particles during oil expression.

In the drying step (S200), the washed perilla is dried with hot air of 30 to 100° C. for 1 to 8 hours to prevent the generation of carcinogens such as trans-fatty acids and benzopyrene due to intense heat.

In this case, the drying step (S200) may be performed together with a stirring step (S210) of evenly stirring perilla.

In the oil expression step (S300), the perilla dried through the drying step (S200) is inserted into the oil expression machine and a perilla oil is expressed for 1 to 60 minutes by application of pressure at a temperature of 0 to 60° C.

In the oil expression step (S300), the oil may be expressed at a pressure of 400 to 900 kgf/cm$^2$.

The oil expression step (S300) is performed after the temperature of the workshop is set to range from 0 to 60° C. in order to prevent the generation of carcinogens such as trans-fatty acids and benzopyrene due to intense heat.

In the oil expression step (S300), it is preferable that an oil expression time is appropriately adjusted according to the amount of perilla.

In the oil expression step (S300), it is preferable that when an oil expression pressure is continuously increased to and then reaches, for example, 200 kgf/cm$^2$, the oil expression pressure is increased per 5 minutes for each step in the range of 10 to 50 kgf/cm$^2$ to be gradually increased over time.

Preferably, this is to prevent the generation of carcinogens such as trans-fatty acids and benzopyrene due to intense heat by minimizing the frictional heat that may occur in the perilla depending on the oil expression pressure.

In the low-temperature treatment step (S500), the perilla oil expressed through the oil expression step (S300) is treated at a low temperature such that it has a temperature less than or equal to 25° C.

In the low-temperature treatment step (S500), since the expressed perilla oil is treated at a low temperature such that various components contained in the perilla oil reach below their respective melting points, the coagulated suspended materials of various components artificially contained in the perilla oil may be generated.

In this case, the temperature of the perilla oil is lower than the room temperature in the low-temperature treatment step (S500). Accordingly, it is preferable to carry out at least one of the low-temperature treatment process in which the perilla oil is processed at a low temperature so that the temperature of the perilla oil is lower than room temperature, the refrigeration process in which the perilla oil is refrigerated so that the temperature of the perilla oil is lower, and the freezing process in which the perilla oil is frozen to freeze the perilla oil for low-temperature treatment in the low-temperature treatment step (S500).

In this case, after the low-temperature treatment step (S500), a precipitation step (S400) of inserting the low-temperature treated perilla oil into a precipitation tank to spontaneously precipitate it for 5 minutes or more may be performed again.

In the filtering step (S600), the perilla oil treated at a low temperature through the low-temperature treatment step (S500) is filtered using the food screen of 1 to 50 μm.

In the filtering step (S600), the coagulated suspended materials generated in the perilla oil treated at a low temperature through the low-temperature treatment step (S500) are filtered so that the perilla oil can be maintained in a clean state without any coagulated suspended material even at a low temperature in the future.

Preferably, the filtering step (S600) is performed after the temperature of the workshop is set to be 25° C. or less in order to filter all coagulated suspended materials generated in various components contained in the perilla oil below the respective melting points of the various components contained in the perilla oil.

In the container charging step (S700), the container is charged with the perilla oil filtered through the filtering step (S600).

The method according to the second embodiment of present invention includes a perilla washing step (S100), a drying step (S200), an oil expression step (S300), a precipitation step (S400), a low-temperature treatment step (S500), a filtering step (S600), and a container charging step (S700), as illustrated in FIG. 2.

In more detail, the method for preparing a perilla oil includes:

a perilla washing step (S100) of inserting perilla into a washing machine to wash it for 1 to 30 minutes;

a drying step (S200) of drying the perilla washed through the perilla washing step (S100) with hot air of 30 to 100° C. for 1 to 8 hours such that the perilla has a moisture percentage of 1 to 15%;

an oil expression step (S300) of inserting the perilla dried through the drying step (S200) into an oil expression machine and expressing a perilla oil for 1 to 60 minutes by application of pressure at a temperature of 0 to 60° C.;

a precipitation step (S400) of inserting the perilla oil expressed through the oil expression step (S300) into a precipitation tank to spontaneously precipitate it for 1 minute or more;

a low-temperature treatment step (S500) of treating the perilla oil precipitated through the precipitation step (S400) at a low temperature such that the perilla oil has a temperature less than or equal to 25° C.;

a filtering step (S600) of filtering the perilla oil treated at a low temperature through the low-temperature treatment step (S500) using a food screen of 1 to 50 μm; and a container charging step (S700) of charging a container with the perilla oil filtered through the filtering step (S600).

In the perilla washing step (S100), the perilla is inserted into the washing machine to be washed for 1 to 30 minutes.

In the drying step (S200), the washed perilla is dried with hot air of 30 to 100° C. for 1 to 8 hours such that the perilla has a moisture percentage of 1 to 15%.

In the drying step (S200), the moisture percentage of the washed perilla is lowered to increase an extraction yield, and the perilla is roasted with hot air so that the expressed perilla oil has a savory fragrance and a flavor.

In the drying step (S200), the moisture percentage of the perilla is to be 1 to 15% so that the moisture between the skin of the perilla and the kernel of the perilla is dried and the moisture between the skins of the perilla is dried, so the perilla particles are arranged evenly, thereby enabling the extraction yield to be increased by applying uniform pressure to the perilla particles during oil expression.

In the drying step (S200), the washed perilla is dried with hot air of 30 to 100° C. for 1 to 8 hours to prevent the generation of carcinogens such as trans-fatty acids and benzopyrene due to intense heat.

In this case, the drying step (S200) may be performed together with a stirring step (S210) of evenly stirring perilla.

In the oil expression step (S300), the perilla dried through the drying step (S200) is inserted into the oil expression machine and a perilla oil is expressed for 1 to 60 minutes by application of pressure at a temperature of 0 to 60° C.

In the oil expression step (S300), the oil may be expressed at a pressure of 400 to 900 kgf/cm$^2$.

The oil expression step (S300) is performed after the temperature of the workshop is set to range from 0 to 60° C. in order to prevent the generation of carcinogens such as trans-fatty acids and benzopyrene due to intense heat.

In the oil expression step (S300), it is preferable that an oil expression time is appropriately adjusted according to the amount of perilla.

In the oil expression step (S300), it is preferable that when an oil expression pressure is continuously increased to and then reaches, for example, 200 kgf/cm$^2$, the oil expression pressure is increased per 5 minutes for each step in the range of 10 to 50 kgf/cm$^2$ to be gradually increased over time.

Preferably, this is to prevent the generation of carcinogens such as trans-fatty acids and benzopyrene due to intense heat by minimizing the frictional heat that may occur in the perilla depending on the oil expression pressure.

In the precipitation step (S400), the perilla oil expressed through the oil expression step (S300) is inserted into the precipitation tank to be spontaneously precipitated for 1 minute or more.

In the low-temperature treatment step (S500), the perilla oil precipitated through the precipitation step (S400) is treated at a low temperature such that it has a temperature less than or equal to 25° C.

The low-temperature treatment step (S500) may be performed after a precipitate-excluded perilla oil extraction step (S410) of extracting only a perilla oil in an upper layer excluding a lower precipitation layer from the perilla oil precipitated through the precipitation step (S400).

In the low-temperature treatment step (S500), since the precipitated perilla oil is treated at a low temperature such that various components contained in the perilla oil reach below their respective melting points, the coagulated suspended materials of various components artificially contained in the perilla oil are generated.

In this case, since the perilla oil extracted from the upper layer, except for the lower precipitation layer, through the precipitate-excluded perilla oil extraction step (S410) is treated at a low temperature such that various components contained in the perilla oil reach below their respective melting points in the low-temperature treatment step (S500), the coagulated suspended materials of various components artificially contained in the perilla oil may be generated.

In this case, the precipitation step (S400) of inserting the low-temperature treated perilla oil into the precipitation tank to spontaneously precipitate it for 5 minutes or more may be performed again after the low-temperature treatment step (S500).

In the filtering step (S600), the perilla oil treated at a low temperature through the low-temperature treatment step (S500) is filtered using the food screen of 1 to 50 μm.

In the filtering step (S600), the coagulated suspended materials generated in the perilla oil treated at a low temperature through the low-temperature treatment step (S500) are filtered so that the perilla oil can be maintained in a clean state without any coagulated suspended material even at a low temperature in the future.

Preferably, the filtering step (S600) is performed after the temperature of the workshop is set to be 25° C. or less in order to filter all coagulated suspended materials generated in various components contained in the perilla oil below the respective melting points of the various components contained in the perilla oil.

In the container charging step (S700), the container is charged with the perilla oil filtered through the filtering step (S600).

The method according to the third embodiment of present invention includes a perilla washing step (S100), a drying step (S200), an oil expression step (S300), a precipitation step (S400), a low-temperature treatment step (S500), a filtering step (S600), and a container charging step (S700), as illustrated in FIG. 2.

In more detail, the method for preparing a perilla oil includes:

a perilla washing step (S100) of inserting perilla into a washing machine to wash it for 5 to 20 minutes;

a drying step (S200) of drying the perilla washed through the perilla washing step (S100) with hot air of 30 to 60° C. for 3 to 5 hours such that the perilla has a moisture percentage of 4 to 7%;

an oil expression step (S300) of inserting the perilla dried through the drying step (S200) into an oil expression machine and expressing a perilla oil for 5 to 20 minutes by application of pressure at a temperature of 0 to 49° C.;

a precipitation step (S400) of inserting the perilla oil expressed through the oil expression step (S300) into a precipitation tank to spontaneously precipitate it for 10 minutes or more;

a low-temperature treatment step (S500) of treating the perilla oil precipitated through the precipitation step (S400) at a low temperature such that the perilla oil has a temperature less than or equal to 8° C.;

a filtering step (S600) of filtering the perilla oil treated at a low temperature through the low-temperature treatment step (S500) using a food screen of 1 to 10 μm; and a container charging step (S700) of charging a container with the perilla oil filtered through the filtering step (S600).

In the perilla washing step (S100), the perilla is inserted into the washing machine to be washed for 5 to 20 minutes.

In the drying step (S200), the washed perilla is dried with hot air of 30 to 60° C. for 3 to 5 hours such that the perilla has a moisture percentage of 4 to 7%.

In the drying step (S200), it is preferable that the washed perilla is dried with hot air of 30 to 60° C. for 3 to 5 hours such that the perilla has a moisture percentage of 4 to 7% by appropriately adjusting the drying time according to the amount of perilla, and it is preferable to focus on the moisture percentage rather than an absolute time and adjust the drying time according to the moisture percentage.

In the drying step (S200), the moisture percentage of the washed perilla is lowered to increase an extraction yield, and the perilla is roasted with hot air so that the expressed perilla oil has a savory fragrance and a flavor.

In the drying step (S200), the moisture percentage of the perilla is to be 4 to 7% so that the moisture between the skin of the perilla and the kernel of the perilla is dried and the moisture between the skins of the perilla is dried, so the perilla particles are arranged evenly, thereby enabling the extraction yield to be increased by applying uniform pressure to the perilla particles during oil expression.

In the drying step (S200), the washed perilla is dried with hot air of 30 to 60° C. for 3 to 5 hours to prevent the generation of carcinogens such as trans-fatty acids and benzopyrene due to intense heat.

In this case, the drying step (S200) may be performed together with a stirring step (S210) of evenly stirring perilla.

Thus, since the drying step (S200) and the stirring step (S210) are simultaneously performed, it is possible to prevent the generation of carcinogens such as trans-fatty acids and benzopyrene due to intense heat.

In the oil expression step (S300), the perilla dried through the drying step (S200) is inserted into the oil expression machine and a perilla oil is expressed for 5 to 20 minutes by application of pressure at a temperature of 0 to 49° C.

In the oil expression step (S300), the oil may be expressed at a pressure of 400 to 700 kgf/cm$^2$.

The oil expression step (S300) is performed after the temperature of the workshop is set to range from 0 to 49° C. in order to prevent the generation of carcinogens such as trans-fatty acids and benzopyrene due to intense heat.

In the oil expression step (S300), it is preferable that an oil expression time is appropriately adjusted according to the amount of perilla.

In the oil expression step (S300), it is preferable that when an oil expression pressure is continuously increased to and then reaches, for example, 300 kgf/cm$^2$, the oil expression pressure is increased per 5 minutes for each step in the range of 10 to 50 kgf/cm$^2$ to be gradually increased to 700 kgf/cm$^2$ over time.

Preferably, this is to prevent the generation of carcinogens such as trans-fatty acids and benzopyrene due to intense heat by minimizing the frictional heat that may occur in the perilla depending on the oil expression pressure.

In the precipitation step (S400), the perilla oil expressed through the oil expression step (S300) is inserted into the precipitation tank to be spontaneously precipitated for 10 minutes or more.

In the low-temperature treatment step (S500), the perilla oil precipitated through the precipitation step (S400) is treated at a low temperature such that it has a temperature less than or equal to 8° C.

The low-temperature treatment step (S500) may be performed after a precipitate-excluded perilla oil extraction step (S410) of extracting only a perilla oil in an upper layer excluding a lower precipitation layer from the perilla oil precipitated through the precipitation step (S400).

In the low-temperature treatment step (S500), since the precipitated perilla oil is treated at a low temperature such that various components contained in the perilla oil reach below their respective melting points, the coagulated suspended materials of various components artificially contained in the perilla oil are generated.

In this case, since the perilla oil extracted from the upper layer, except for the lower precipitation layer, through the precipitate-excluded perilla oil extraction step (S410) is treated at a low temperature such that various components contained in the perilla oil reach below their respective melting points in the low-temperature treatment step (S500), the coagulated suspended materials of various components artificially contained in the perilla oil may be generated.

In this case, the precipitation step (S400) of inserting the low-temperature treated perilla oil into the precipitation tank to spontaneously precipitate it for 5 minutes or more may be performed again after the low-temperature treatment step (S500).

In the filtering step (S600), the perilla oil treated at a low temperature through the low-temperature treatment step (S500) is filtered using the food screen of 1 to 10 μm.

In the filtering step (S600), the coagulated suspended materials generated in the perilla oil treated at a low temperature through the low-temperature treatment step (S500) are filtered so that the perilla oil can be maintained in a clean state without any coagulated suspended material even at a low temperature in the future.

Preferably, the filtering step (S600) is performed after the temperature of the workshop is set to be 8° C. or less in order to filter all coagulated suspended materials generated in various components contained in the perilla oil below the respective melting points of the various components contained in the perilla oil.

In the container charging step (S700), the container is charged with the perilla oil filtered through the filtering step (S600).

The present invention will be described below in more detail with reference to the following example according to the embodiment of the present invention, but it should be understood that this is by way of illustration and example only for clarifying the special purpose of the invention and understanding the prominent effects of the invention with more ease and is not to be taken by way of limitation with the scope of the present invention. Therefore, it should be understood that the scope of the present invention is not limited.

Example 1

EXAMPLE

After 20 kg of perilla is inserted into a washing machine to be washed for 15 minutes and is put in a colander to remove water for 10 minutes, the washed perilla is evenly stirred, roasted, and dried with hot air of 30° C. until it has a moisture percentage of 5%. Next, the temperature of the workshop is set at 25° C., and the dried perilla is inserted into an oil expression machine to express an oil by continuously increasing the oil expression pressure of the oil expression machine to 400 kgf/cm², increasing the oil expression pressure by 50 kgf/cm² per 5 minutes after the oil expression pressure is 400 kgf/cm², and additionally pressurizing the perilla for 20 minutes until the oil expression pressure reaches 600 kgf/cm². Next, the expressed perilla oil is inserted into a precipitation tank to be spontaneously precipitated for 30 minutes until a precipitation layer is generated, and only a perilla oil formed in an upper layer above the precipitation layer is extracted and treated at a low temperature until it reaches 5° C. Next, the temperature of the workshop is set at 5° C., the low-temperature treated perilla oil is filtered by a food screen of 5 μm, and a container is charged with the filtered perilla oil. Then, after the perilla oil charged in the container is stored in a refrigerator for about 10 hours, the sensory evaluation is carried out as follows.

Comparative Example 1

The perilla oil is prepared according to the preparation method for "Patent Literature 1". In order to perform a highly accurate sensory evaluation, the preparation process is performed only on perilla except for sesame and corn oil. Since the oil is extracted in such a manner that the sesame and the perilla are pulverized, inserted into the corn oil, and heated in the preparation method for "Patent Literature 1", this process is applied to the conventional perilla oil extraction method to express and prepare the perilla oil with no pulverization process.

After 20 kg of perilla is heated at a temperature of 190° C. for 10 minutes, it is primarily filtered by the centrifuge to remove solids. Next, after the perilla is secondarily filtered by the filter press to remove fine solids and is cooled at room temperature, 6 g of polyphenox is added, and the perilla oil is charged to the container. Then, after the perilla oil charged in the container is stored in the refrigerator for about 10 hours, the sensory evaluation is carried out as follows.

Comparative Example 2

The perilla oil is prepared according to the preparation method for "Patent Literature 2". The perilla oil is prepared according to the method for preparing edible oil from which the saturated fatty acids in the perilla oil are removed, which is described in <Example 8> of "Patent Literature 2".

50.33 gm of thoroughly dehydrated perilla oil is obtained by decompression for about 30 minutes in the silicone-oil bath heated to 105° C., mixed with 250 ml of anhydrous ethanol, and added with 400 μl of 28% sodium-methoxide. Next, the mixture is stirred by the magnetic stirrer for about 5 hours to obtain a transparent solution from which the interface between the oil layer and the ethanol layer is removed by the transesterification reaction. The equivalent amount of glacial acetic acid (110 μl) is applied to the sodium-methoxide used to stop the reaction for neutralization, a solution made by heating and dissolving 80 gm of urea in 250 ml of anhydrous ethanol is mixed, and then the mixture is left for one evening while being cooled as slow as possible by keeping warmth. Next, when the ethyl ester of the saturated fatty acid forms a urea complex to precipitate as crystals, the crystals are removed by suction filtration, the filtrate is decompressed and concentrated to recover and recycle the anhydrous ethanol and the urea-complex of unsaturated fatty acid is destroyed to precipitate an unsaturated fatty acid by applying a small amount of water and d-HCl to the remainder. Next, the unsaturated fatty acid is extracted as hexane, the hexane is concentrated to obtain the ethyl ester of unsaturated fatty acid, the saturated fatty acid is removed by the urea-complex method with the ethyl ester is made by the transesterpicase reaction. Next, after the ethyl ester is dried well for the obtained unsaturated fatty acid, 10.55 gm of glycerine-triacetate and 400 μl of 28% sodium-methoxide solution are mixed, and triglyceride of unsaturated fatty acid is re-synthesized by the interesterification reaction by decompressing the mixture to 50 mm/Hg or less while being heated at 90 to 125° C. in the silicone-oil bath to remove ethyl-acetate by the interesterification reaction, and triglycerides composed of only unsaturated fatty acids is obtained. When the reaction is completed and bubbles are not formed any more, 110 μl of glacial acetic acid is added to the reactant for neutralization and water is added thereto. Next, the mixture is repeatedly extracted as hexane and concentrated to remove saturated fatty acids, and a perilla oil consisting of only unsaturated fatty acids is extracted. Next, the container is charged with the perilla oil. After the perilla oil charged in the container is stored in the refrigerator for about 10 hours, the sensory evaluation is carried out as follows.

Comparative Example 3

20 kg of perilla is washed in the cold water of 18° C. and put in the colander to remove water. The temperature of the workshop is set at 19° C. or less, and the relative humidity is maintained at 20% using the dehumidifier. The perilla is sufficiently dried for about 3 hours using a cold fan set at 15 to 16° C. It is checked whether the perilla is easily ruptured by rubbing with the hand during the cold air drying. After the dried perilla is inserted into the mesh-structured cloth made of polyester and pre-pressurized at a pressure of 580 kgf/cm² for 10 minutes, ultrasonic vibration is applied to the perilla. The perilla is pressurized again at a pressure of 600 kgf/cm² to express oil. After the obtained oil is charged in the container and stored in the refrigerator for about 10 hours, the sensory evaluation is carried out as follows.

Comparative Example 4

20 kg of perilla is washed by stirring in the 2% sodium bicarbonate mixed solution at a temperature of 35° C. for 5 minutes, and then dried using a high-speed dehydrator such that the moisture content of the perilla is 15%. Next, after the roasting fan is kept at a temperature of 310° C. and the perilla is roasted by heating at a temperature of 200° C. for 20 minutes, the perilla oil is prepared by application of a pressure of 630 kgf/cm² at a temperature of 95° C. Next, after 200 g of pulverized charcoal activated carbon powder having a particle size of 50 meshes is added to the expressed perilla oil, the mixture is stirred for 35 minutes. The perilla oil mixed with the charcoal activated carbon powder is filtered using the press filter of 0.1 μl. After the filtered oil is charged in the container and stored in the refrigerator for about 10 hours, the sensory evaluation is carried out as follows.

<Sensory Evaluation 1>

The sensory evaluation is performed on the flavor, fragrance, visual preference, and overall preference of the perilla oil prepared through the above "Example" and "Comparative Examples 1 to 4", and the result is shown in the following [Table 2]. The sensory evaluation is carried out using a 9-point scoring method for 50 food experts and general consumers, and the result is shown in the following [Table 1].

Flavor: the sensory evaluation is carried out with the score of 9 points when the savory taste of the perilla oil is alive and the bitter taste thereof is minimal.

Fragrance: the sensory evaluation is carried out with the score of 9 points when the savory fragrance of the perilla oil is alive and the fishy smell thereof is minimal.

Visual Preference: the sensory evaluation is carried out with the score of 9 points when the perilla oil is clean without residues and the clean and transparent color thereof is observed with the naked eyes.

Overall Preference: the sensory evaluation is carried out with the score of 9 points when the flavor, fragrance, and visual preference are synthetically determined to be excellent.

TABLE 1

| Score | Evaluation Criteria |
|---|---|
| 9 | Very good |
| 7 | Good |
| 5 | Average |
| 3 | Bad |
| 1 | Very bad |

TABLE 2

| | Flavor | Fragrance | Visual Preference | Overall Preference |
|---|---|---|---|---|
| Example | 8.5 | 8.3 | 8.9 | 8.6 |
| Comparative Example 1 | 7.3 | 7.6 | 4.5 | 6.4 |
| Comparative Example 2 | 7.8 | 7.2 | 6.8 | 7.3 |
| Comparative Example 3 | 5.6 | 5.2 | 7.8 | 6.2 |
| Comparative Example 4 | 7.6 | 7.5 | 5.3 | 6.8 |

Referring to the above [Table 2], it can be seen that the perilla oil prepared through the preparation method according to the embodiments of the present invention is superior to the perilla oil prepared through the preparation method for "Comparative Examples 1 to 4" in terms of flavor, fragrance, visual preference, and overall preference.

It is determined that this is because the perilla is stirred and dried with hot air so as to be suitable for preparing the perilla oil so that the flavor and fragrance of the perilla oil are alive at the time of oil expression, the expressed perilla oil is subjected to natural precipitation and low-temperature treatment to filter precipitates and coagulated suspended materials, and the clean and transparent perilla oil is thus prepared so that the preference of the consumer is doubled since the coagulated suspended materials are not generated during cold storage.

<Examination of Benzopyrene Content>

Benzopyrene is a type of polycyclic aromatic hydrocarbon (PAH) and is an environmental hormone that causes various cancers and mutation when it is accumulated in the human body. The benzopyrene in food may be produced in the process of heating the food, and may be produced by incompletely burning carbohydrates, proteins, fats, and the like, which are the main components of food, when cooking or processing the food at a high temperature.

The benzopyrene content of the perilla oil prepared through the above "Example" and "Comparative Examples 1 to 4" is examined by the test method notified by the Ministry of Food and Drug Safety. As the experimental equipment, a high-performance liquid chromatographic apparatus (MODEL: SP9255), a fluorescence detector of JASCO FP-2020PLUS, and an autosampler are used. After N-dimethylformamide-water (9:1) and hexane are extracted using 3-methylolanthrene as an internal material, they are purified with a solid phase extraction (SPE) cartridge and analyzed with a high-speed liquid chromatography/fluorescence detector. The analyzed result is shown in the following [Table 3].

TABLE 3

| | Amount of expressed oil (kg) | Criteria | Result | Item Determination |
|---|---|---|---|---|
| Example | 5.6 | 2.0 ppb (μg/kg) or less | 0.7 ppb | suitable |
| Comparative Example 1 | 4.2 | | 4.3 ppb | unsuitable |
| Comparative Example 2 | 3.2 | | 2.2 ppb | unsuitable |
| Comparative Example 3 | 5.7 | | 0.3 ppb | suitable |
| Comparative Example 4 | 5.1 | | 2.7 ppb | unsuitable |

Referring to the above [Table 3], in the perilla oil prepared according to the "Example", the detection amount of benzopyrene is less than or equal to the legal reference value of 2.0 ppb, which is determined to be excellent since it is far below the reference value. It can be seen that this is because the perilla is stirred and dried with weak hot air so as to exhibit an excellent extraction yield and minimize the generation of harmful substances due to intense heat.

However, it can be seen that since the perilla oil according to the "Comparative Examples 1 to 4" is processed by intense heat, the perilla oil is determined to be unsuitable in the item determination and is unsuitable for food consumption.

Meanwhile, in the "Comparative Example 3", the detection amount of benzopyrene is the least of 0.3 ppb. However, since the perilla oil is extracted from fresh perilla in the "Comparative Example 3", the flavor and fragrance thereof are lower than that of the perilla oil prepared according the "Example" of the present invention in the sensory evaluation. Therefore, it is found that the perilla oil prepared according the present invention is comprehensively determined to be most suitable compared to that prepared by other conventional technologies in terms of flavor, fragrance, visual preference, overall preference, harmlessness as food, and the like.

Figure 3:
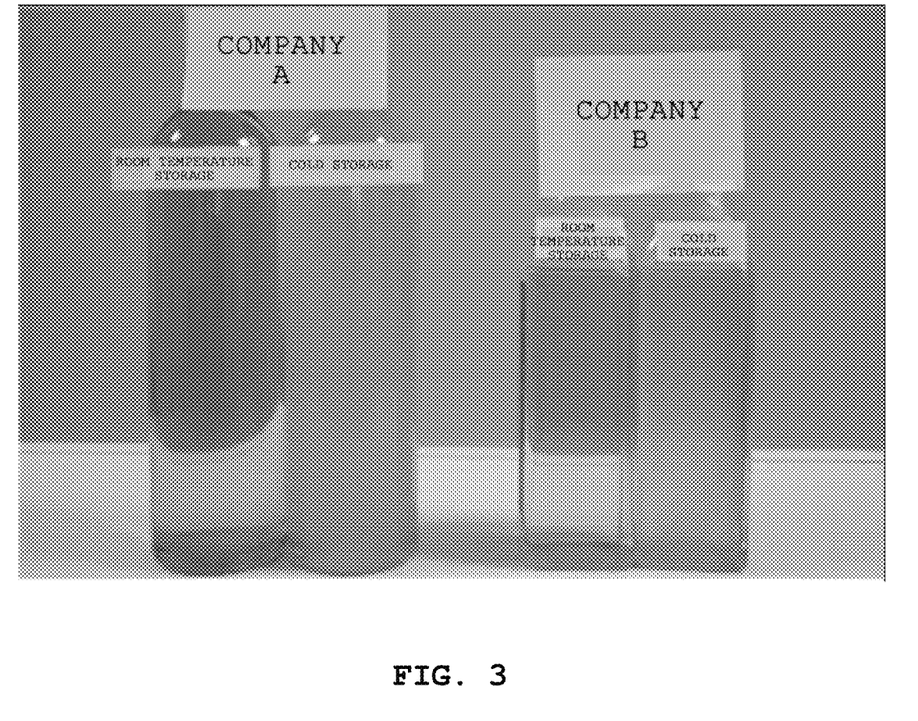
FIGS. 3 and 4 are photographs illustrating the room temperature storage of the commercially available perilla oil prepared by the conventional preparation method and the cold storage of the same perilla oil.
Figure 4:
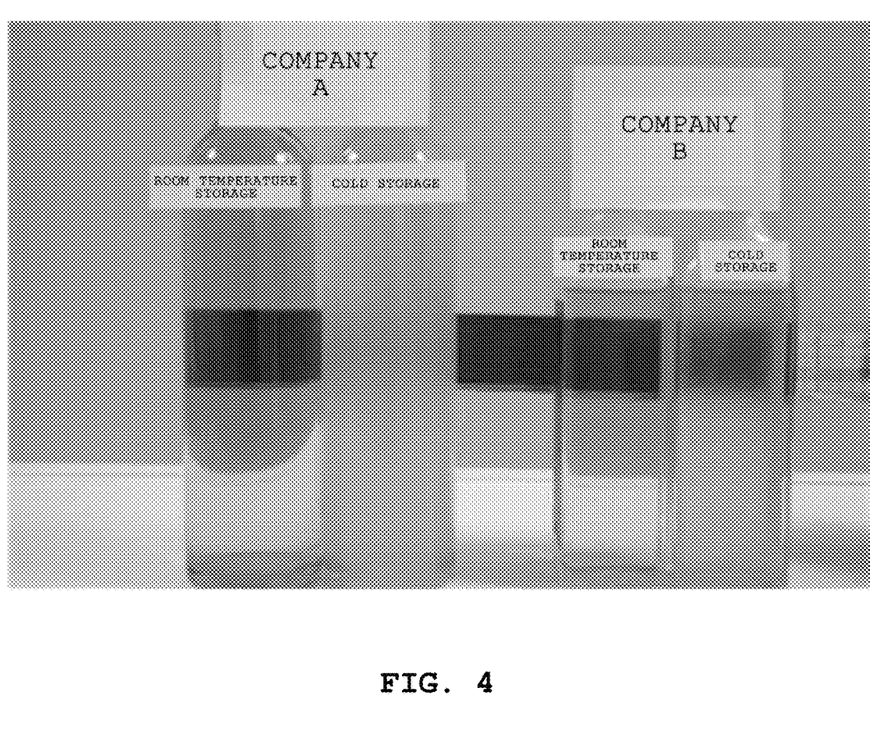

Meanwhile, FIGS. 3 and 4 are photographs illustrating the room temperature storage of the commercially available perilla oil prepared by the conventional preparation method and the cold storage of the same perilla oil. As illustrated in FIGS. 3 and 4, it can be easily confirmed with the naked eyes that coagulated/condensed/frozen suspended materials are generated when the perilla oil prepared by the conventional preparation method is refrigerated. It can be confirmed that when a black-painted ruler is brought to the back of the transparent glass bottle, suspended materials are severely generated so that the black-painted ruler is not seen.

Figure 5:
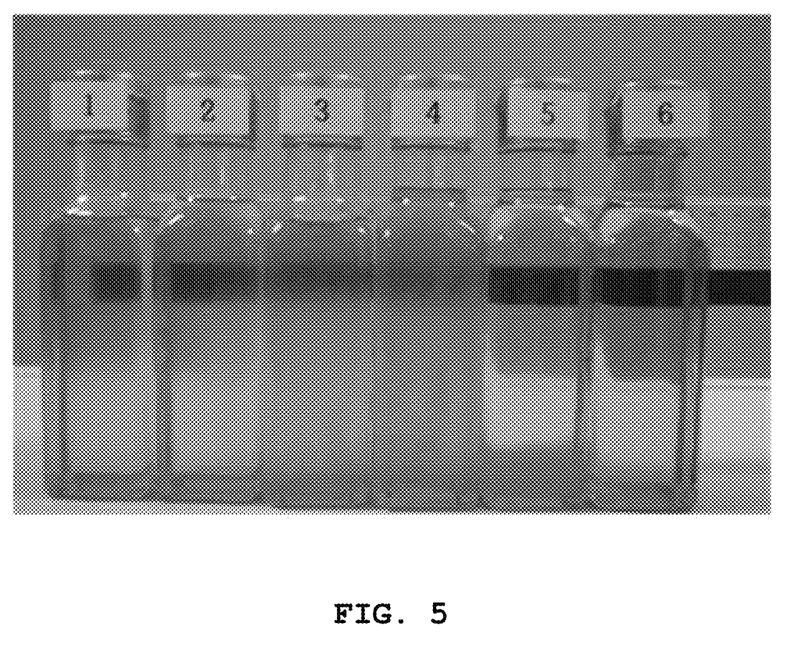
FIG. 5 is a photograph illustrating a state in which the perilla oil is prepared according to the preparation method of the present invention, wherein attachment Nos. 1 to 4 illustrate the state of the refrigerated perilla oil after the low-temperature treatment step, attachment No. 5 illustrates the state of the refrigerated perilla oil after the precipitation, and attachment No. 6 illustrates the state of the perilla oil completed by the preparation method of the present invention.

On the other hand, FIG. 5 is a photograph illustrating a state in which the perilla oil is prepared according to the preparation method of the present invention. In FIG. 5, attachment Nos. 1 to 5 illustrate the state of the refrigerated perilla oil after only the precipitation and filtering steps without the low-temperature treatment step in the preparation steps of the present invention. Various components contained in the perilla oil are coagulated, condensed, frozen, and suspended materials are generated in various forms depending on the component, even though the perilla oil is subjected to the precipitation step and the filtering step. Therefore, it can be seen that the low-temperature treatment step is essential in order to obtain a clear and clean perilla oil. Attachment No. 6 illustrates the state of the perilla oil completed by the preparation method of the present invention including the low-temperature treatment step. It can be seen that the perilla oil of attachment No. 6 is kept clear and clean with no coagulated suspended material as in the drawing, even though it is refrigerated. Through comprehensive analysis, it can be seen that the low-temperature treatment step is a core step that must be necessarily performed to obtain a clear and clean perilla oil even at a low temperature.

While the present invention has been described with respect to the specific embodiments, it will be apparent to those skilled in the art that various changes and modifications may be made without departing from the spirit and scope of the present invention as defined in the following claims.

INDUSTRIAL APPLICABILITY

The present invention provides a method for preparing a high-quality clean perilla oil that does not give an eating person an unpleasant feeling wherein in the low-temperature storage and cold storage of perilla oil, which are essentially implemented to increase the storage period of the perilla oil through the minimization of rancidity of the perilla oil, a perilla oil is provided without the generation of coagulated suspended materials during low-temperature cold storage. Therefore, it can be useful in the field of a food.

What is claimed is:

1. A method for preparing a low-temperature treated perilla oil for suppressing generation of coagulated suspended materials during low-temperature cold storage, the method comprising:
    a perilla washing step (S100) of inserting perilla into a washing machine to wash it for 5 to 20 minutes;
    a drying step (S200) of drying the perilla washed through the perilla washing step ((S100)) with hot air of 30 to 60° C. for 3 to 5 hours such that the perilla has a moisture percentage of 4 to 7%;
    an oil expression step (S300) of inserting the perilla dried through the drying step (S200) into an oil expression machine and expressing a perilla oil for 5 to 20 minutes by application of pressure at a temperature of 0 to 49° C., wherein when the pressure as an oil expression pressure is continuously increased to and then reaches 300 kgf/cm$^2$, the oil expression pressure is increased per 5 minutes for each step in the range of 10 to 50 kgf/cm$^2$ to be gradually increased to 700 kgf/cm$^2$ over time;
    a precipitation step (S400) of inserting the perilla oil expressed through the oil expression step (S300) into a precipitation tank to spontaneously precipitate it for 10 minutes or more;
    a precipitate-excluded perilla oil extraction step (S410) of extracting only a perilla oil in an upper layer excluding a lower precipitation layer from the perilla oil precipitated through the precipitation step (S400);
    a low-temperature treatment step (S500) of treating the perilla oil, extracted from the upper layer excluding the lower precipitation layer through the precipitate-excluded perilla oil extraction step (S410), at a low temperature ranging from −5° C. to 5° C.;
    a filtering step (S600) of filtering the perilla oil treated at a low temperature through the low-temperature treatment step (S500) using a food screen of 1 to 10 μm; and
    a container charging step (S700) of charging a container with the perilla oil filtered through the filtering step (S600),
    wherein the perilla oil is provided without generation of suspended materials during low-temperature cold storage, and generation of carcinogens such as trans-fatty acids and benzopyrene is minimized.

2. A low-temperature treated perilla oil for suppressing generation of coagulated suspended materials during low-temperature cold storage, prepared by the method according to claim 1.

* * * * *